United States Patent [19]
Gryspeerdt et al.

[11] Patent Number: 6,056,639
[45] Date of Patent: May 2, 2000

[54] CLEANING MEANS FOR A COMBINE HARVESTER

[75] Inventors: José G. T. Gryspeerdt, Poesele; Eric P. J. Van Queckelberge, Moerkerke; Marc R. M. Jonckheere, Shellegem; Andre G. J. Dhont, Maldegem, all of Belgium

[73] Assignee: New Holland North America, Inc., New Holland, Pa.

[21] Appl. No.: 09/139,908

[22] Filed: Aug. 26, 1998

[30] Foreign Application Priority Data

Aug. 29, 1997 [GB] United Kingdom ............... 9718204

[51] Int. Cl.$^7$ .......................... A01F 12/30; A01F 12/32; A01D 17/00
[52] U.S. Cl. ............... 460/101; 460/85; 460/90; 460/145
[58] Field of Search .................... 460/100, 101, 460/99, 119, 85, 90, 145; 56/14.6

[56] References Cited

U.S. PATENT DOCUMENTS

| | | | |
|---|---|---|---|
| 2,284,433 | 5/1942 | Korsmo et al. ................. | 460/101 |
| 3,913,589 | 10/1975 | Rouse et al. ................. | 130/24 |
| 4,344,443 | 8/1982 | De Busscher et al. ........... | 130/272 |
| 4,897,071 | 1/1990 | Desnijder et al. .............. | 460/101 |
| 5,791,986 | 8/1998 | Underwood et al. ............. | 460/101 |

*Primary Examiner*—Thomas B. Will
*Assistant Examiner*—Meredith C. Petravick
*Attorney, Agent, or Firm*—J. William Stader; Larry W. Miller; Frank A. Seemar

[57] ABSTRACT

An agricultural harvesting machine having a threshing and separating mechanism for threshing and separating crop material; and cleaning mechanism for cleaning the threshed and separated crop material. The cleaning mechanism comprising: a grain pan for receiving threshed and separated crop material and transporting the latter rearwardly; and an upper and lower sieves installed behind said grain pan and operable to receive the material from said grain pan and move it through and along. At least one portion of said grain pan is inclined in a sideways direction for sideways movement of said threshed and separated crop material while it is being transported rearwardly towards said sieve. This inclination spreads out the surplus of crop material supplied to one longitudinal section of the grain pan and delivers it in an even pattern to the front section of the upper sieve.

16 Claims, 4 Drawing Sheets

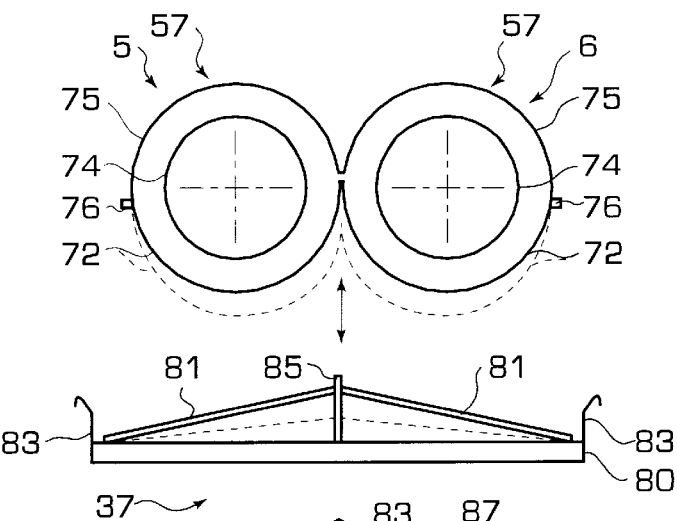
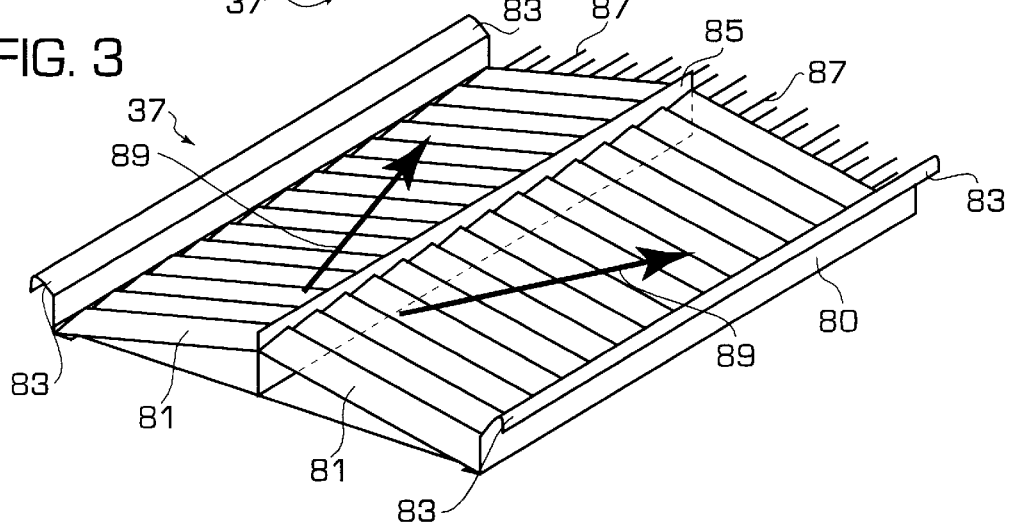
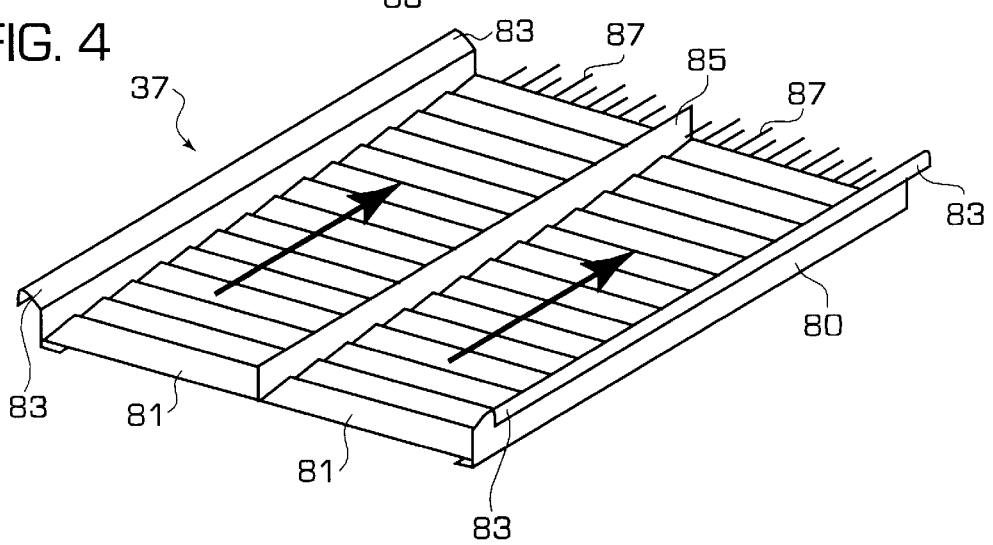

CLEANING MEANS FOR A COMBINE HARVESTER

BACKGROUND OF INVENTION

1. Field of Invention

The present invention relates to agricultural harvesting machines, such as combine harvesters, and more particularly to the cleaning means for separating the crop product from discardable material, such as chaff or straw particles.

2. Description of Prior Art

Commonly, combine harvesters comprise a plurality of sieves installed below the threshing concave and straw walkers for receiving the mixture of grain kernels, chaff and short straw from the threshing mechanism and separating the discardable material therefrom while guiding the kernels to a conveyor arrangement for transport to a grain tank on top of the harvester. A fan installed below the sieves assists in making the discardable material airborne and conveying it out of the harvester.

In order to optimize the effectiveness of the cleaning arrangement the mixture of threshed material has to be guided to the sieves in a uniform and even manner. Therefore a grain pan having a corrugated surface is installed below the threshing mechanism. The grain pan is linked to the sieves and is oscillated in unison therewith. The threshed material collected on the grain pan is spread out and conveyed rearwardly to the upper sieve in an even layer.

It has been experienced with certain threshing configurations such as axial flow threshing and separating systems, that the length of the grain pan is sometimes insufficient for completely leveling this layer by the time it reaches the sieves, such that one portion of the upper sieve might get overloaded while another portion might hardly be covered with the crop and chaff mixture. Then the sieve arrangement is not working efficiently as not the full sieve surface is utilized and, moreover, the wind distribution pattern of the fan is disturbed because part of the wind is escaping with no significant resistance through the low load sections of the sieves. The consequent pressure drop also affects the cleaning action on the fully loaded sieve portions. Hence, there is a need for supplementary measures in order to improve the distribution of the threshed crop material at the end of the grain pan.

It is well known in the art to provide upright dividers on the corrugated surface of the grain pan to prevent sideways movement of the crop material. This is particularly useful when the combine harvester is traveling on sideways slopes. Such dividers may also be installed at an angle to the longitudinal axis of the combine harvester to spread out a surplus of threshed material in a particular area of the combine harvester. However each divider is causing an accumulation of material along its surface such that the crop mixture is still delivered in heaps to the sieves. Different crop conditions will also require readjustment of the orientation of the deflectors for continued optimum delivery of the threshed and separated material to the sieves.

It is also known to provide guide plates or baffles between the threshing concaves and the grain pan to improve the distribution of the threshed crop material falling onto the cleaning arrangement. However when there is a major unbalance between different sections of the threshing mechanism, the guide plates have to be set at steep angles, making the system prone to plugging of the concaves.

SUMMARY OF THE INVENTION

It therefore is an object of the present invention to provide an effective and reliable system for improving the distribution of threshed crop material at the rear end of the grain pan.

According to the invention there is provided an agricultural harvesting machine, comprising a threshing and separating mechanism for threshing and separating crop material; and a cleaning means for cleaning the threshed and separated crop material. The cleaning means comprising:

- a grain pan means for receiving threshed and separated crop material and transporting the latter rearwardly;
- a sieve means installed behind said grain pan means and operable to receive the material from said grain pan means and move it through and along; and
- a fan means, operable to cause an air flow through said sieve means for lifting up discardable part from the crop material and transporting it out of the combine harvester.

The harvesting machine being characterized in that at least one portion of said grain pan means is inclined in a sideways direction for sideways movement of a portion of said threshed and separated crop material while it is being transported rearwardly towards said sieve means.

When the grain pan means comprise means for varying the inclination for adjusting the inclination angle thereof, the path of the threshed crop material can be adapted to the actual distribution of the material from the threshing mechanism. A higher setting may be required for small grains such as wheat at a lower setting for larger grains such as corn kernels. Advantageously this adjustment of the inclination can be linked to the adjustment of the threshing mechanism for the different crops.

The number of inclined sections preferably is equal to the number of threshing rotors and concaves, so two inclined grain pan portions are proposed for a twin rotor axial flow combine harvester.

When the overload is concentrated in one narrow area of the grain pan, it may be advantageous to provide substantially horizontal grain pan sections adjacent the inclined portions. Thereby the sideways movement of the crop material is stopped after the heaps in the narrow area are spread out. This avoids accumulation of material at the edges of the inclined portions. The length of these portions should be at least equal to the length of the threshing rotor and concave disposed thereabove and more advantageously to the length of the concave section through which most of the material is provided to the grain pan means.

The inclined area may then constitute a rectangular, a trapezoidal or a triangular surface. In the latter case one can dispose of a fill plate at the rear end of the inclined grain pan portions.

BRIEF DESCRIPTION OF THE DRAWINGS

An agricultural harvesting machine according to the present invention will now be described in greater detail, by way of example, with reference to the accompanying drawings.

FIG. 2 is a cross section of the threshing mechanism and a grain pan according to a first embodiment of the present invention, the cross section being taken along line II—II in FIG. 1.

FIGS. 3 and 4 are perspective views of the grain pan according to the first embodiment, shown in an elevated and a leveled position.

DETAILED DESCRIPTION OF THE INVENTION

The terms "forward", "left", "right", "rear", etc. used in connection with the agricultural harvesting machine and components thereof are determined with reference to the direction of forward operative travel, but should not be considered as limiting.

Figure 1:
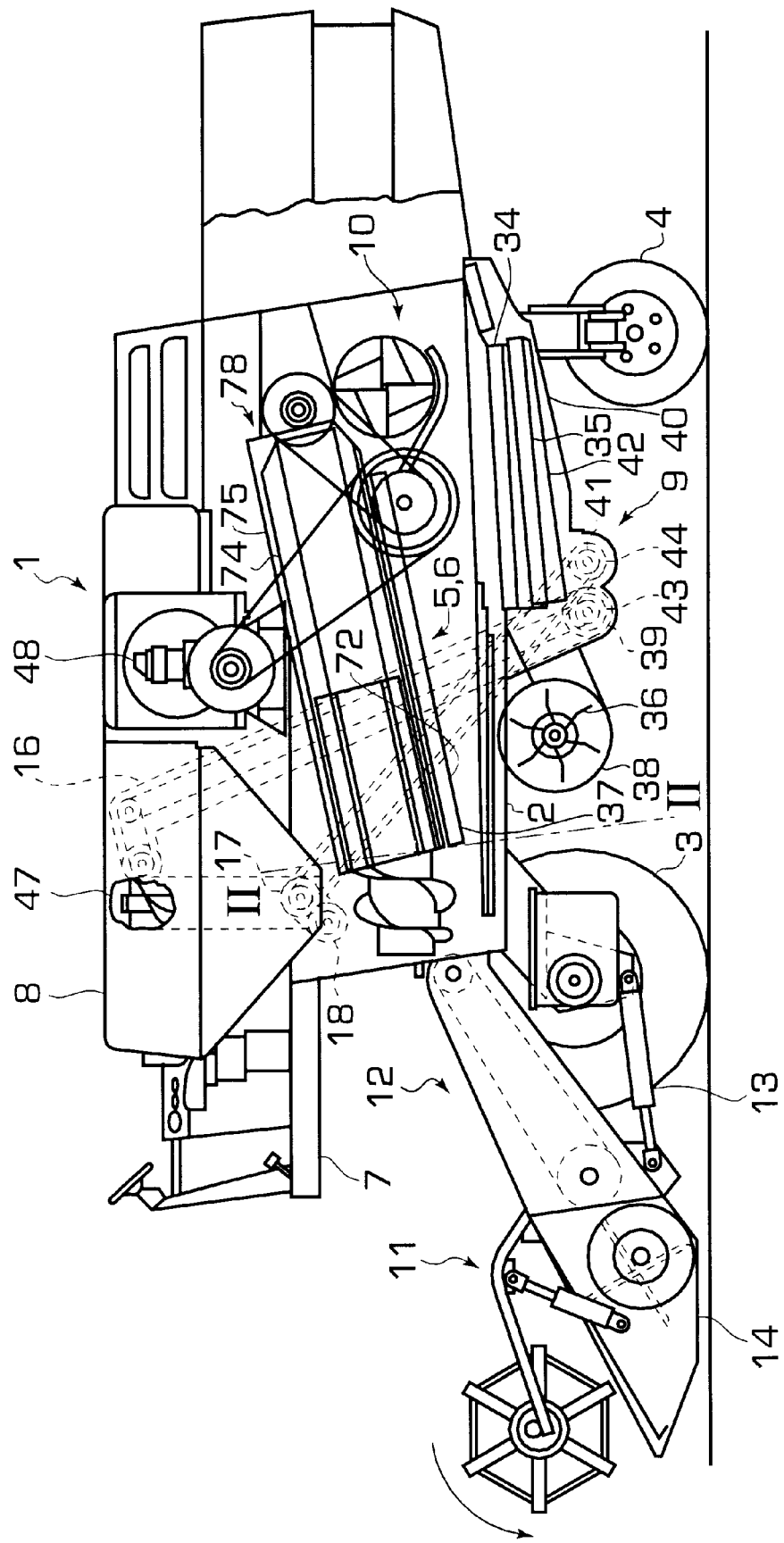
FIG. 1 is a side elevation, partly in section of a combine harvester comprising a threshing mechanism and a cleaning means including a grain pan embodying the present invention.

Referring now to FIG. 1, the combine harvester shown therein, generally indicated at 1, comprises a main frame 2 supported on front drive wheels 3 and smaller rear steerable wheels 4. Supported on the main frame 2 are a threshing and separating mechanism in the form of right- and left-hand threshing and separating units 5, 6 respectively, extending generally longitudinally of the harvester, an operator's platform 7, a grain tank 8, grain cleaning means 9, and a rotary straw discharge means 10. A conventional header 11 and a straw elevator 12 extend forwardly of the machine and the elevator 12 is pivotally secured to the frame 2 for generally vertical movement which is controlled by extensible hydraulic cylinders 13.

As the combine harvester 1 is traveled forwardly over a field, the crop material which is to be harvested is severed from the stubble by a sickle bar cutter 14 on the header 11 and is conveyed by the straw elevator 12 to the threshing and separating units 5, 6. The material received within the threshing and separating units 5, 6 will be threshed and separated, that is to say the crop material (which may be wheat, corn, rice, soy beans, rye, grass seed, barley, oats or other similar crop materials) is rubbed and beaten whereby the grain, seed etc. is loosened and separated from the straw, stalks, cobs or other discardable part of the crop material. While the terms "grain" and "straw" are used principally throughout this description for convenience, it should be understood that the terms are not intended to be limiting. The term "grain" as used herein thus refers to that part of the crop material that may be threshed and separated from the discardable part of the crop material which will be referred to as "straw".

The straw is discharged from the rear of the threshing and separating units 5, 6 onto a feeder plate of the rotary discharge means 10 which finally discharge the straw to the ground. The grain and other material which has been separated from the straw falls onto the grain cleaning means 9 which include means to separate clean grain and means to separate unthreshed material (known in the art as "tailings") from the remainder of the material received in the cleaning means. The cleaned grain is then elevated into the grain tank 8 by an elevator 16, and the tailings are raised by an elevator 17 and fed by an auger 18 to the unthreshed crop material delivered by the straw elevator 12 to the threshing and separating mechanism.

The threshing and separating units 5, 6 comprise fore-and-aft extending, generally cylindrical rotors 74 housed in casings 57 defined in part by removable upper walls 75 extending the entire length of the units and being secured to the main frame 2 of the combine 1. Threshing concaves 72 complete the generally cylindrical casings 57. The concaves 72 are formed by a number of longitudinally extending bars secured to a number of transverse arcuate supporting beams which are generally concentric to the rotors 74. Wires extend in transverse direction through the concave bars. The concaves 72 are mounted for pivotment about a longitudinal axis 76 in order to enable the selection of the optimum concave setting for a given crop condition (FIG. 2). The pivot axis is parallel to the rotor axis and located near the sides of the frame 2. A conventional adjustment system (not shown) can be used for jointly varying the clearance between the concaves 72 and the rotors 74.

The grain cleaning means 9 include an oscillatory chaffer sieve 34, an oscillatory grain sieve 35, a fan 36 and an oscillatory grain pan assembly 37. The separated grain is discharged from the threshing and separating units 5, 6 onto the grain pan assembly 37 or the forward end of the sieve 34. The chaffer sieve 34 is provided with means whereby the apertures in the sieve can be adjusted so that grain received on the sieve may fall through the sieve while the trash is shaken rearwardly for discharge, the lighter chaff also being blown rearwardly by the fan 36 mounted in a housing 38. The grain sieve 35 is provided with apertures which permit only the grain to pass therethrough down to a grain auger 39; anything larger than the grain, such as the tailings, being discharged to the rear of the sieve 35 onto an oscillator chute or guide 40, which then directs any tailings into a tailings auger 41. The cleaned grain drops onto a chute 42 and then is directed to the grain auger 39. The grain pan assembly 37, chaffer sieve 34, grain sieve 35 and chute 42 are oscillated in a fore-and-aft direction of the combine harvester. The grain auger 39 and tailings auger 41 are disposed in troughs 43 and 44, respectively, formed in a casing which is an extension of the fan housing 38. The grain is conveyed from the trough 43 to the grain tank 8 by the elevator 16 and the tailings conveyed to the front portion of the threshing and separating units 5, 6 by the auger 18 via the tailings elevator 17. The grain may be discharged from the grain tank 8 by a grain unloading auger which forces the grain to a discharge spout 47.

The various components of the combine 1 are driven from a conventional internal combustion engine 48. Only the drive means to the threshing and separating units 5, 6 are illustrated in FIG. 1.

As illustrated in FIGS. 2–4, the grain pan assembly 37 comprises a generally rectangular grain pan frame 80, extending over the full width of the main frame 2 and mounted by conventional means not shown for oscillation therein. The crop receiving and conveying surface of the grain pan is constituted by a pair of grain pan portions 81, which are mounted inside the frame 80 and extend in the longitudinal direction of the combine harvester 1. Each portion 81 is pivotably attached to the frame 80 by a pair of pivots 83 adjacent the sides of said frame 2. The surface of the grain pan portions 81 is corrugated, e.g. according to a saw-tooth profile, for proper engagement of the crop material and rearward movement thereof during oscillation of the grain pan assembly 37.

The lateral inclination the grain pan portions 81 can be adjusted by appropriate adjustment means coupled to each of the movable portions 81. Advantageously both portions 81 may be linked to a single adjustment system for simultaneous and equal setting of both inclinations. Specifically, a single lever means may be used to change the position of both the left and right portion 81. In their upper position the combined surface of the portions 81 constitutes a generally roof-shaped grain pan surface. The lowermost position of the portions 81 is defined by abutments on the frame 80 to constitute a level grain pan surface.

A vertical divider plate 85 is attached to the frame 80, in-between the two movable portions 81. Appropriate sealing means, such as rubber strips (not shown), affixed to the inner rims of the portions 81, prevent the loss of grain through the longitudinal gaps between these rims and the divider plate 85. No further divider plates have been installed on the surface of the movable portions 81 or any other part of the grain pan assembly 37 to enable free sideways movement of the crop material from the center to the sides of this assembly. Two comb sections 87 extend from the rear rim of the movable portions 81 for retaining straw which is traveled thereover and exposing it to an air flow which is directed through the gap between the rear end of the grain pan assembly 37 and the front end of the chaffer sieve 34.

The operator is able to adapt the setting of the grain pan assembly 37 to the distribution of the crop material delivered thereto by the threshing and separating mechanism. This distribution depends upon the type of crop being harvested. For example, the threshing of small grains causes an important afflux of material to the central section of the cleaning means 9, while the load on the side sections is notably less. Under these circumstances part of the crop material should be shifted sideways to present an even layer of crop material to the chaffer sieve 34. The movable portions 81 are raised to add a sideways movement to the rearward movement of the crop material during oscillation of the grain pan assembly 37. The inclination can be adapted to the actual load on the different grain pan sections: e.g., when dry wheat is harvested, the overload caused by the wheat kernels and the chaff in the middle section, will require the setting of the height to a maximum value (FIG. 3). For most small grains (such as wheat, barley, rye) a similar overload in the middle section may be expected, such that the grain pan portions 81 should be raised accordingly.

Most of the crop material deposited on the front section of the grain pan surface will shift to the underloaded side sections while being thrown to the rear of the grain pan assembly 37 (arrow 89). The crop material deposited on the rear section does not have time to migrate to the sides, such that, in the end, the crop material is distributed more evenly by the time it falls onto the chaffer sieve 34.

Otherwise, the threshing of crops having larger kernels, such as corn, peas or beans, effects a more even distribution of material on the grain pan surface. Such material behaves more like a fluid and migrates more easily towards the sides, even on a horizontal grain pan. Under these circumstances it would be inappropriate to shift the mixture of grain and straw sideways. Accordingly the movable portions 81 are lowered to their level position, shown in FIG. 4.

It is observed that also the settings of the threshing concaves 72 have to be adapted to the diameter of the grain kernels. Small grains require a close setting of the concaves 72 to the rotor 74 (solid lines in FIG. 2), while larger grains require a more distant setting (dashed lines in FIG. 2). Advantageously the adjustment of the concaves 72 may be linked to the adjustment of the grain pan assembly 37, such that a single operation by the operator suffices to adapt both systems to another crop type. Such linkage may be realized through a lever system, mechanically interconnecting the positioning systems of the concaves 72 and of the movable grain pan portions 81, or by a single electronic system controlling electrical actuators for the positioning of said concaves and of the movable portions. Through such linkage, the operator simultaneously raises both the concaves 72 and the grain pan portions 81 when small grains are to be harvested, and lowers the same when larger grains are to be harvested.

The distribution of threshed material from the threshing and separating units 5, 6 on the cleaning means 9 may be such that the load thereon is evenly distributed over its full width, apart from a median area of the grain pan assembly 37. Then it is preferable not to extend the inclined portions over the full width of the grain pan assembly 37, but to limit the inclined area to a portion of the assembly 37.

Figure 5:
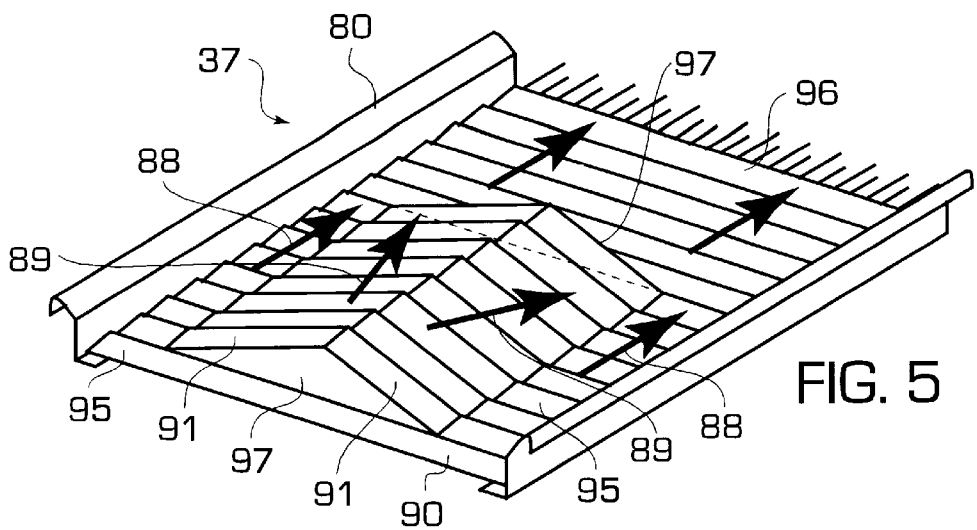
FIG. 5 is a perspective view of a grain pan according to a second embodiment of the present invention.

Such embodiment is illustrated in FIG. 5. The grain pan assembly 37 comprises a corrugated, substantially horizontal grain pan surface 90 onto which a pair of inclined grain pan portions 91 are mounted. The grain pan portions are arranged at an angle to the horizontal surface 90 which is substantially equal to 10°. The total area covered by the inclined portions 91 extends over about two thirds of the full width of the assembly 37, leaving horizontal areas 95 on both sides of inclined portions 91. The grain kernels that have reached the horizontal areas 95 are further transported in a longitudinally extending, rearward direction as illustrated by the arrows 88 in FIG. 5. The arrangement of the inclined portions 91 smoothens out the overload in the central area and maintains the even distribution in the side areas.

In the longitudinal direction the inclined portions 91 extend below and beyond the length of the front sections of the threshing and separating units 5, 6, i.e. beyond the sections of the rotors 74 and the concaves 72 which perform the threshing action upon the crop conveyed thereto by the straw elevator 12. There remains a horizontal grain pan area 96 behind the inclined portions 91 for finally leveling out the threshed crop material and preparing an even layer for delivery to the chaffer sieve 34.

In order to prevent accumulation of material in the space below the inclined sections 91 and above the horizontal grain pan surface 90, triangular end plates 97 are provided at the front and the rear end of the sections 91.

Figure 6:
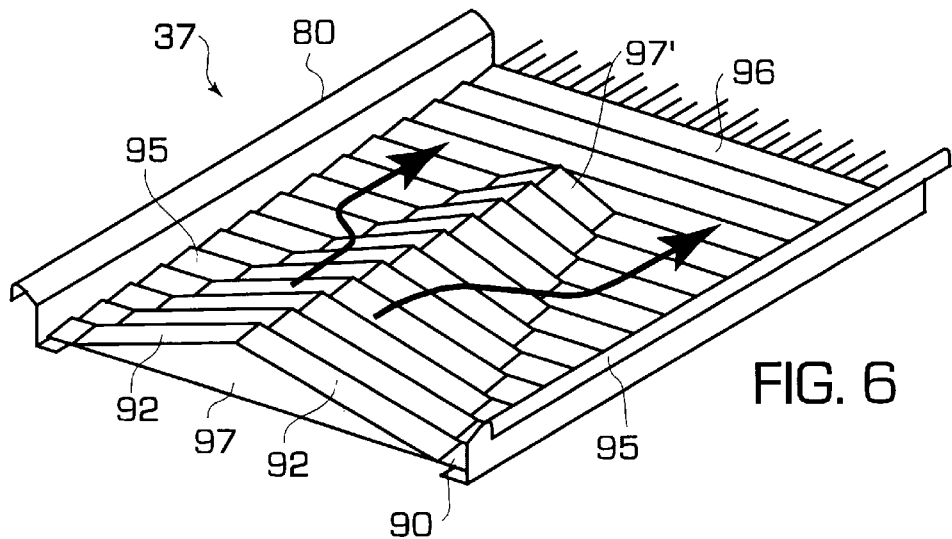
FIGS. 6 and 7 are perspective views of further embodiments of the present invention.
Figure 7:
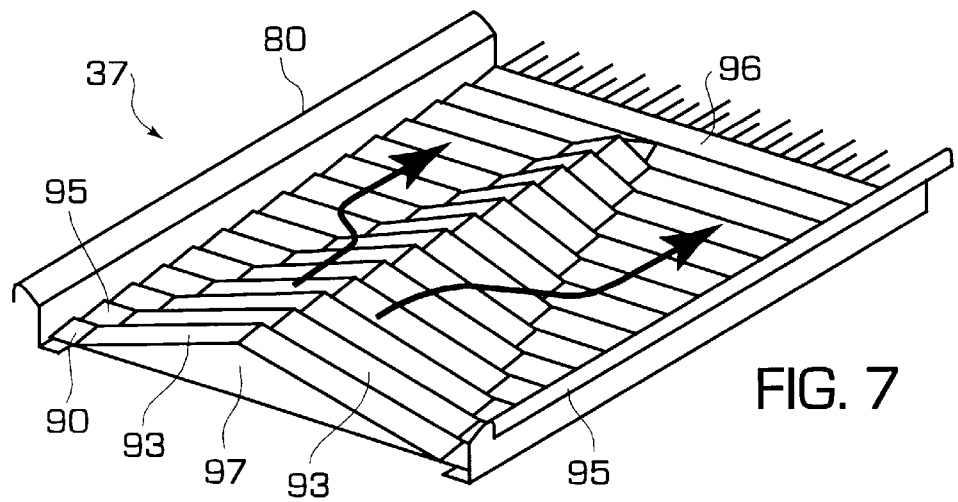

Alternative embodiments are illustrated in FIGS. 6 and 7. Herein the inclined portions 92, 93 do not cover a rectangular surface, but a trapezoidal or a triangular surface. These configurations might provide an acceptable material distribution for various crops and harvest conditions, without requiring replacement or adjustment of the inclined portions 92, 93.

The grain pan portions 92 according to FIG. 6 only require a small rear end plate 97'. When a triangular surface is used, as in FIG. 7, the rear end plate can be disposed of completely. These embodiments further present the advantage that the space for the leveled material next to the inclined portions 92, 93 increases while the material moves in the direction of the sieves 34, 35.

The grain cleaning means 9 have a fixed position to the main frame 2, as illustrated in the embodiments above. However, it also conceivable to mount the elements of the cleaning means 9 to a movable subframe, as described in U.S. Pat. No. 4,344,443 incorporated herein by reference. The position of such subframe to the main frame 2 can be varied to adapt to slopes of the field. To this end, the subframe is journaled at its rear and front end for sideways leveling of the cleaning means 9 when the combine harvester 1 is traveling along a sideways slope.

Figure 8:
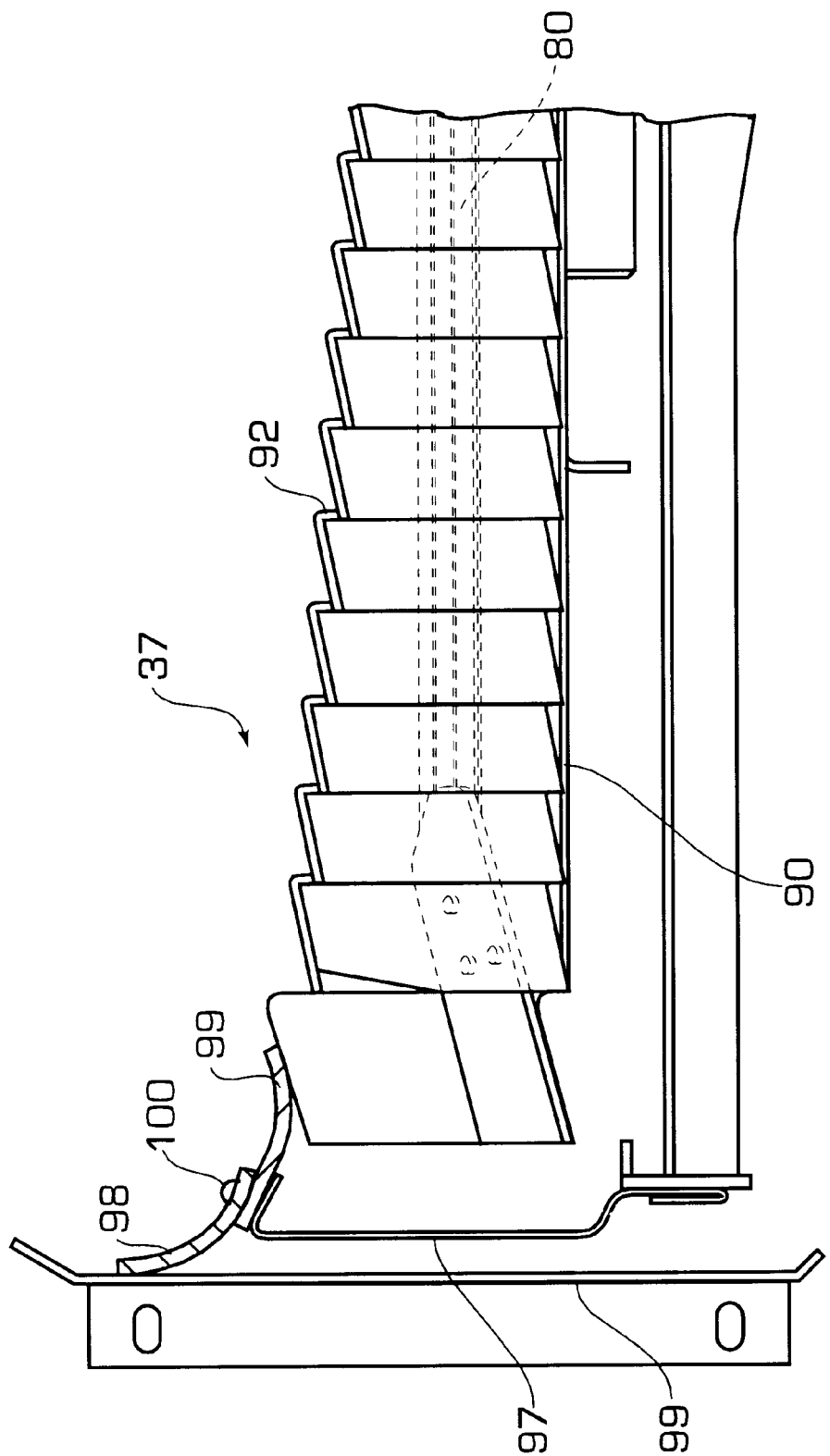
FIG. 8 is a cross sectional view of the front portion of the grain pan of FIG. 6.

As illustrated in FIG. 8, a flexible sealing is provided between the grain pan assembly 37 and a front wall 99 affixed to the main frame 2. The sealing comprises two transversely arranged strips 98 in resilient material, such as rubber, which are affixed by a profile 100 to the upper rim of the front plate 97. The profile 100 is riveted to the front plate 97. The strips 98 keep in contact with the wall 99 during the oscillation of the grain pan assembly 37, thereby preventing the loss of threshed material through the transverse gap between the front wall 99 and the front edge of the grain pan portions 92. They also allow for the movement of the grain pan assembly 37 when the subframe is pivoted to the main frame 2 during harvesting operations on slopes.

It will be obvious to those skilled in the art that various changes may be made without departing from the scope of the invention and the invention is not to be considered limited to what is illustrated in the drawings and described in the specification.

What is claimed is:

1. An agricultural harvesting machine, comprising:
   a threshing and separating mechanism for threshing and separating crop material; and
   a cleaning mechanism for cleaning the threshed and separated crop material, the cleaning mechanism further comprising:
      a grain pan for receiving threshed and separated crop material and transporting the latter rearwardly said grain pan further comprising a means for varying the inclination of said inclined portion;
      a sieve installed behind said grain pan for receiving the material from said grain pan and moving it through and along; and
      a fan, operable to cause an air flow through said sieve for lifting up discardable part from the crop material and transporting it out of the harvesting machine; and
      said harvesting machine having in that at least one portion of said grain pan which is inclined in a sideways direction for sideways movement of a portion of said threshed and separated crop material while it is being conveyed rearwardly towards said sieve.

2. An agricultural harvesting machine according to claim 1, further comprising a means for jointly adjusting the setting of said threshing and separating mechanism and the inclination of said inclined portion.

3. An agricultural harvesting machine according to claim 2, wherein:
   said threshing and separating mechanism further comprises a threshing rotor and a concave associated therewith; and
   said adjusting means further comprises a means for jointly adjusting the setting of said concave to said rotor and the inclination of said inclined portion.

4. An agricultural harvesting machine according to claim 3, wherein said threshing and separating mechanism further comprises a plurality of longitudinally arranged threshing rotors and said grain pan further comprises a plurality of inclined portions.

5. An agricultural harvesting machine according to claim 4, wherein said inclined portions have adjacent highest edges.

6. An agricultural harvesting machine according to claim 5, further comprising an upright divider which is provided in between said inclined portions.

7. An agricultural harvesting machine according to claim 6, wherein the surface of said inclined portion is free from upright dividers.

8. An agricultural harvesting machine according to claim 7, further comprising means for transversely leveling said sieve.

9. An agricultural harvesting machine according to claim 8, wherein said grain pan comprises at least one horizontal grain pan portion.

10. An agricultural harvesting machine according to claim 9, wherein the area of the inclined portion of said grain pan extends over substantially two thirds of the width of said grain pan.

11. An agricultural harvesting according to claims 10, wherein:
    said threshing and separating mechanism further comprises a front threshing section and a rear separating section; and
    said inclined portion of said grain pan extends beyond the rear end of said threshing section.

12. An agricultural harvesting machine according to claim 11, wherein the area of said inclined portion is substantially rectangular in shape.

13. An agricultural harvesting machine according to claim 11, wherein the area of said inclined portion is substantially trapezoidal in shape with its widest base adjacent the front of the grain pan.

14. An agricultural harvesting machine according to claim 11, wherein the area of said inclined portion is substantially triangular in shape with its base adjacent the front of the grain pan.

15. An agricultural harvesting machine according to claim 12, wherein at least one portion has a sideways inclination substantially equal to $10°$ to the horizontal.

16. An agricultural harvesting machine according to claim 15, further comprising a resilient sealing which is attached to the front of said at least one inclined portion for sealing the gap between said grain pan and a front wall of said agricultural harvesting machine.

* * * * *